(12) United States Patent
Kerscher

(10) Patent No.: US 10,793,006 B2
(45) Date of Patent: Oct. 6, 2020

(54) DEVICE AND A METHOD FOR OPERATING A RAIL VEHICLE WITHOUT AN OVERHEAD LINE

(71) Applicant: SIEMENS MOBILITY GMBH, Munich (DE)

(72) Inventor: Manfred Kerscher, Moehrendorf (DE)

(73) Assignee: Siemens Mobility GmbH, Munich (DE)

(*) Notice: Subject to any disclaimer, the term of this patent is extended or adjusted under 35 U.S.C. 154(b) by 332 days.

(21) Appl. No.: 15/750,998

(22) PCT Filed: Aug. 3, 2016

(86) PCT No.: PCT/EP2016/068503
§ 371 (c)(1),
(2) Date: Feb. 7, 2018

(87) PCT Pub. No.: WO2017/025399
PCT Pub. Date: Feb. 16, 2017

(65) Prior Publication Data
US 2018/0222325 A1 Aug. 9, 2018

(30) Foreign Application Priority Data
Aug. 7, 2015 (DE) .................. 10 2015 215 174

(51) Int. Cl.
*B60L 5/28* (2006.01)
*B60L 9/00* (2019.01)
(Continued)

(52) U.S. Cl.
CPC ...... *B60L 5/28* (2013.01); *B60L 5/24* (2013.01); *B60L 5/42* (2013.01); *B60L 9/00* (2013.01);
(Continued)

(58) Field of Classification Search
CPC ...... B60L 5/24; B60L 5/28; B60L 5/42; B60L 53/32; B60L 9/00; B60L 11/18; B60L 5/16; B60M 1/12; B60M 1/36; B60M 1/02
(Continued)

(56) References Cited

U.S. PATENT DOCUMENTS

| 3,955,657 A | * | 5/1976 | Bossi | B60L 5/42 |
| | | | | 191/2 |
| 5,124,510 A | * | 6/1992 | Garfinkle | B60L 5/19 |
| | | | | 191/59.1 |

(Continued)

FOREIGN PATENT DOCUMENTS

| DE | 102014000514 A1 | 7/2014 |
| EP | 2639097 A2 | 9/2013 |

(Continued)

OTHER PUBLICATIONS

Article by Stefan Göbel: "UITP: Siemens präsentiert in Mailand Digitalisierungstrends" [Siemens presents digitization trends in Milan], Turnkey: Tram for the Qatar Education City published in the periodical "Stadtverkehr" 60th year Edition Jun. 2015, pp. 20-22—English translation.

*Primary Examiner* — Jason C Smith
(74) *Attorney, Agent, or Firm* — Laurence Greenberg; Werner Stemer; Ralph Locher

(57) ABSTRACT

A rail installation has an overhead line in the region of a stop and at least one rail vehicle with a current collector for making contact with the overhead line. The overhead line has a central part having a limited, predefined length and an adjoining end portion. The central part has a substantially constant predefined height above a rail. The end portion has a height that increases outward from the central part. The current collector of the rail vehicle is raised and matched to the overhead line such that, as the rail vehicle enters the stop, (Continued)

sliding strips of the current collector have a height above the rail that is at least equal to the substantially constant height of the central part of the overhead line, and that is at most equal to the greatest height of the raised first end portion of the overhead line above the rail.

11 Claims, 5 Drawing Sheets

(51) Int. Cl.
*B60L 5/42* (2006.01)
*B60M 1/36* (2006.01)
*B60L 53/30* (2019.01)
*B60L 5/24* (2006.01)
*B60M 1/12* (2006.01)

(52) U.S. Cl.
CPC ............... *B60L 53/32* (2019.02); *B60M 1/12* (2013.01); *B60M 1/36* (2013.01); *B60L 2200/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
USPC ............................................................ 191/2
See application file for complete search history.

(56) References Cited

U.S. PATENT DOCUMENTS

| | | | |
|---|---|---|---|
| 2007/0062771 A1* | 3/2007 | Li | B60L 5/18 191/50 |
| 2009/0121678 A1* | 5/2009 | Mitake | B60L 5/42 320/109 |
| 2010/0322465 A1* | 12/2010 | Wesche | B60L 5/24 382/100 |
| 2011/0030574 A1* | 2/2011 | Kitanaka | B60L 5/28 105/49 |
| 2012/0226398 A1* | 9/2012 | Castle | B60L 5/36 701/22 |
| 2014/0042279 A1* | 2/2014 | Kadono | B61L 25/026 246/167 R |
| 2014/0202817 A1* | 7/2014 | Nitti | B60L 5/24 191/59.1 |
| 2015/0136555 A1* | 5/2015 | Kanazawa | B60L 5/28 191/59.1 |
| 2015/0352959 A1* | 12/2015 | Buehs | B60L 5/08 191/59.1 |
| 2017/0124783 A1* | 5/2017 | Alm | B60L 5/24 |
| 2017/0240051 A1* | 8/2017 | Noack | B60M 1/36 |

FOREIGN PATENT DOCUMENTS

| | | |
|---|---|---|
| EP | 2857252 A1 | 4/2015 |
| FR | 2894888 A1 | 6/2007 |
| JP | 06086407 A | 3/1994 |
| WO | 2013124996 A1 | 8/2013 |
| WO | 2016030210 A1 | 3/2016 |
| WO | 2016046028 A1 | 3/2016 |

* cited by examiner

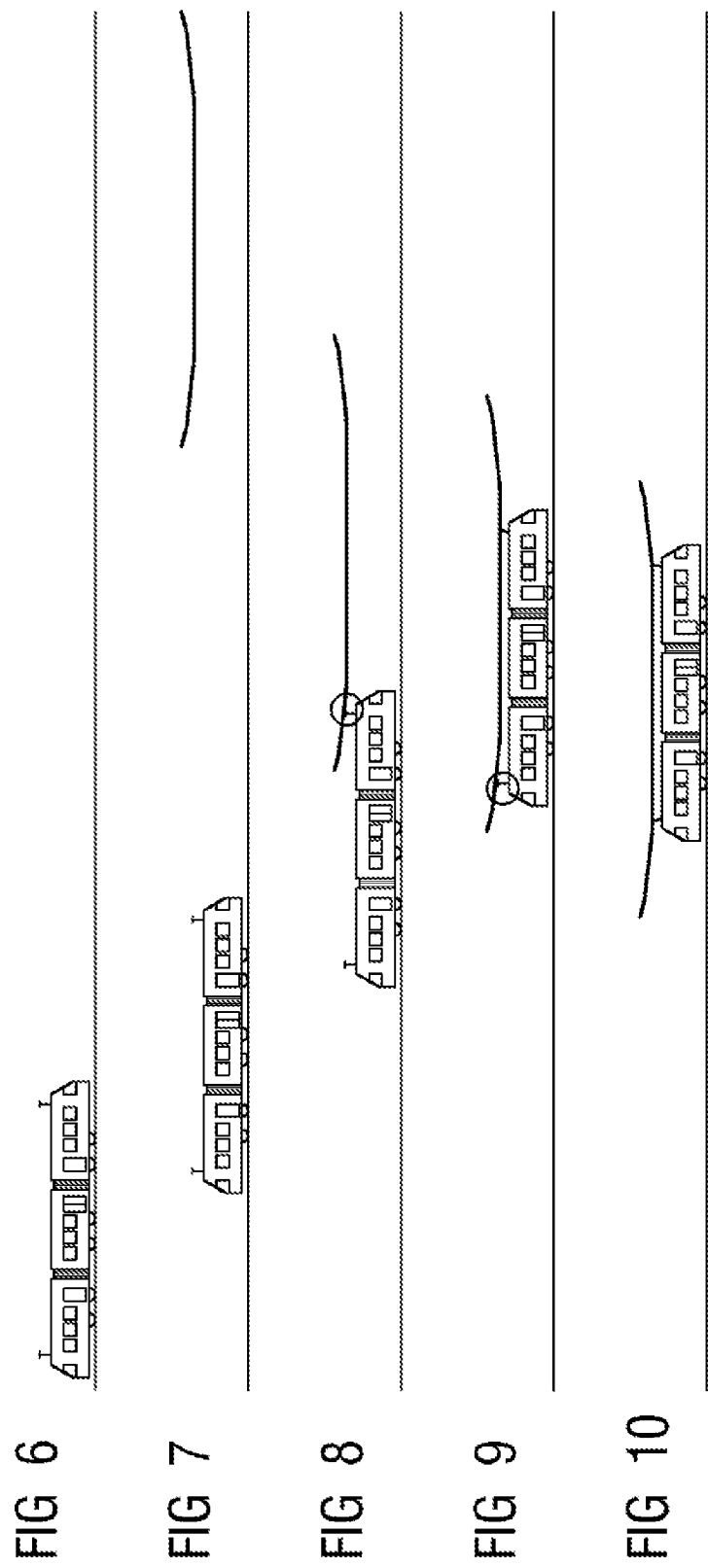

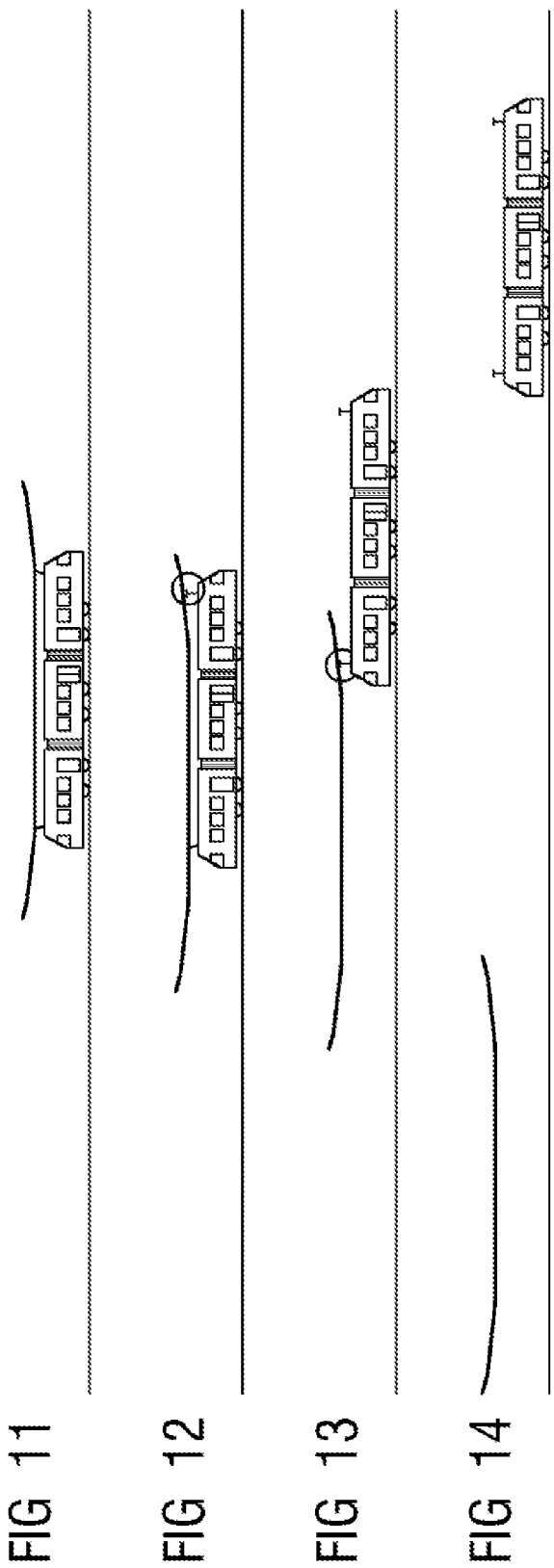

DEVICE AND A METHOD FOR OPERATING A RAIL VEHICLE WITHOUT AN OVERHEAD LINE

BACKGROUND OF THE INVENTION

Field of the Invention

The invention relates to an equipment comprising an overhead line in the region of a stop and at least one rail vehicle having a current collector for making contact with the overhead line, wherein the overhead line has a central part having a limited, predefined length and adjoining it on at least one side a first end portion, wherein the central part has a substantially constant predefined height above the rail, and the first end portion has a height above the rail that increases outward from the central part, and to a method for operating the equipment.

An article in the periodical "Stadtverkehr", volume 60, issue June 2015, pages 20-22, describes the Avenio QEC tram by Siemens AG. This tram comprises two small current collectors for making contact with an overhead contact rail that is ramped on both sides and that is disposed in the region of stops. For travel without an overhead line, the tram has an energy storage system, by means of which it is driven between the stops. In the stops, the energy storage system is charged by means of an overhead contact rail and current collectors.

For conventional single-arm roof current collectors, operation of trams without a contact wire, by means of energy storage devices inside the vehicle, means very high loading because of very frequent raising/lowering cycles. The current collector in this case must be lowered before sections without a contact wire, and raised again before the stop for the purpose of charging the energy storage device. Thus, operation of a normal route would require, for example, approximately 750 raising/lowing cycles per day. By contrast, conventional trams operated from an overhead line only require approximately 5 to 10 cycles.

The electric raising/lowering drives of the current collectors used hitherto are designed for approximately 75,000 to 150,000 cycles, which could mean a corresponding short service life, of only 100 to 200 days. Durable electric drives, on the other hand, are very cost-intensive.

SUMMARY OF THE INVENTION

The invention is based on the object of proposing a simple and inexpensive solution for operating a rail vehicle without a contact wire, in which energy storage devices inside the vehicle are charged via an overhead line at the stop, and operation of the rail vehicle without an overhead line is effected between the stops.

The object is achieved by the provisions of the claims. Developments and embodiments of the invention are found in the features of the dependent claims.

An equipment according to the invention comprises at least one overhead line in the region of a stop, and at least one rail vehicle having at least one current collector for making contact with the overhead line. The overhead line is disposed in a fixed manner and has a limited length. It comprises a central part having a predefined length and having a substantially constant predefined height above the rail, and adjoining it on at least one side a first end portion having a height above the rail that increases outward from the central part.

According to the invention, the raised current collector of the rail vehicle is realized and matched to the overhead line such that, as the rail vehicle enters the stop, sliding strips of the current collector have a height above the rail that is at least equal to the substantially constant height of the central part of the overhead line, and that is at most equal to the greatest height of the raised first end portion of the overhead line above the rail.

The current collector serves to transfer electrical energy from the overhead line to the vehicle, and for this purpose comes into contact with the contact wire. Usually, it has so-called galvanic sliding strips, which establish a galvanic connection to the overhead line.

The rail vehicle is a rail vehicle that, at least partly, is driven electrically, in particular a public transport network vehicle such as, in particular, a tram. The overhead line is part of a route network. It is disposed, in the region of a stop, at at least one predefined location in the route network for the purpose of supplying the rail vehicle with electrical energy for driving the rail vehicle. It has a limited length between two ends. In the immediate vicinity of the at least one overhead line, the route network is without further overhead lines in the further course of the route network.

Between the two ends of the overhead line, the overhead line comprises the central part and at least one end portion that directly adjoins the central part. The central part has a predefined length that is suitable, in particular, for providing the electrical energy for accelerating the vehicle to a predefined speed. The central part is realized such that it has a substantially constant distance from the rail, in particular over the entire length of the central part.

The rail vehicle moves along the rail, for example a standard profile rail having a rail head or a usually common railway rail, and rolls on its running surface, in particular the rail head. The height of the overhead line above the rail is thus measured between the running surface of the rail and the side of the overhead line that faces toward it. Similarly, the distance of the sliding strip of the current collector to the rail is measured between the side of the sliding strip that faces toward the overhead line and the running surface of the rail. The height above ground could also be used as an alternative term for the height above the rail, the ground surface being that on which the vehicle moves.

The end portion has, in particular, a course that rises outward from the central part of the overhead line. The distance of the end portion of the overhead line from the running surface of the rail thus increases from the central part to the opposite end of the end portion. In particular, the distance of the end portion of the overhead line to the running surface of the rail describes a monotone function, in particular a strictly monotone function. The end portion is thus continuous, without discontinuities or gaps. In a development, the course of the end portion is constant. The end portion of the overhead line rises outward from the central part and, in comparison with the latter, has a greater distance from the rail.

According to a development of the solution according to the invention, it is provided that the first end portion runs substantially rectilinearly at an angle of not more than 5°, in particular not more than 3°, in relation to the central part of the overhead line. It therefore forms a ramp. Otherwise, the rail and the central part run approximately parallel to each other. Similarly, in a development the angle of the first end portion in relation to the central part is at least 1°, in particular at least 2°.

What is important is that the impact of the current collector on the overhead line is withstood, both by the current collector and by the overhead line. Besides the angle of the first end portion, the impact force is determined by the speed of the vehicle.

The greatest height above the rail is that of the substantially rectilinear, raised first end portion of the overhead line at its end that faces away from the central part of the overhead line. This height is dimensioned such that, with the entire tolerance chain being taken into account, the current-collector sliding strip always impinges in this region. As a result, there are maximum and minimum height differences, relative to the rail, between the end of the first end portion that faces away from the central part, and the central part.

In a development, the angle and the length of the first end portion of the overhead line are selected such that the difference between the greatest height of the first end portion above the rail and the height of the central part above the rail is at least 50 mm, in particular at least 100 mm, but at most 500 mm, in particular at most 250 mm.

The length of the first end portion results from the angle and the height difference.

In a development, in the transition between the first end portion and the central part of the overhead line, the overhead line has a radius that is greater than 1000 mm, in particular greater than 5000 mm. A smooth transition, of the current collector from the first end portion to the central part of the overhead line, is thus ensured.

Alternatively, the first end portion is realized, for example, in the form of a runner. It is then bent outward with a predefined curvature. Advantageously, the transition to the central part is again continuous. The current collector thus slides, without impacts, on the first end portion, and from the first end portion onto the central part.

Further designs are conceivable. What is important is that the first end portion, raised relative to the central part, reduces, in particular reduces evenly, the difference in the heights between the central part and the first end portion relative to the rail, and matches the height of the overhead line to the height of the central part.

One advantage is that, when in the raised state, the current collector of the rail vehicle can easily thread into the overhead line. Another advantage consists in that the current collector is easy to construct and can be produced inexpensively.

According to a development, the current collector is realized as a single-arm current collector, wherein an upper arm of the current collector is mounted in a rotationally movable manner, by means of a joint, directly on a basic frame of the current collector. The current collector thus does not have a lower arm, or a knee joint between the upper arm and the lower arm. For the purpose of making contact with the fixed overhead line, the current collector, in particular its basic frame, is disposed on a roof of the rail vehicle.

Besides the upper arm, the current collector comprises a rocker for accommodating the sliding strips, which rocker is fastened to, and in particular rotatably mounted on, the upper arm. The upper arm, for its part, is directly mounted on the basic frame of the current collector by means of a joint, such that the setting of the height of the sliding strips above the basic frame, and consequently above the roof of the rail vehicle, is effected by means of the setting of the angle of the upper arm in relation to the basic frame, or to the roof of the vehicle, and thus ultimately in relation to the rail. For the purpose of raising and lowering the upper arm about the joint in relation to the basic frame, the current collector also additionally comprises a suitable drive, for example an electric-motor drive or a pneumatic drive.

According to the invention, the raising and lowering of the current collector is not necessary in normal operation, but only for actions performed when the vehicle is not in operation, e.g. when the vehicle is parked in a depot. Likewise, an emergency actuation may be provided, e.g. by means of a hand crank.

Current collectors of simple construction, for example lyre current collectors, are known from the prior art, e.g. also known as auxiliary current collectors from the field of subway trains, for the purpose of supplying electrical energy to the subway train during servicing work in a depot. They are not designed for frequent raising/lowering cycles. According to the invention, however, as a result of the overhead line being realized in the region of the stop, the current collector can remain in the raised state during travel.

In a development, the overhead line is realized as a fixed contact rail. At least the central part and the first end portion of the overhead line, possibly also the second end portion, and in particular the overhead line, are realized as fixed contact rails over their entire length. A contact rail, disposed like an overhead contact wire above the rail vehicle, is also referred to as an overhead contact rail.

It would also be possible for only the end portions of the overhead line to be realized as fixed contact rails, and the central part of the overhead line to be realized as a contact wire. It is also conceivable for the entire overhead line to be realized as a contact wire.

According to a development of the invention, the overhead line has a second end portion, having a height above the rail that increases outward from the central part, which end portion adjoins the side of the central part that is opposite the first end portion.

The second end portion in this case is realized, in particular, so as to be structurally identical to the first end portion, the overhead line thus being symmetrical. If the first end portion forms a ramp, then the overhead line is also ramped in the region of the second end portion. When the vehicle travels into the stop, the first end portion serves as an entry ramp, the second end portion analogously serving as an exit ramp. The current collector is thus easily separated again from the overhead line.

However, the symmetrical structure of the overhead line appears to be absolutely necessary only in the case of bidirectional operation, i.e. when a vehicle can enter the stop from both sides.

A further development consists in that the overhead line has at least one further, third, end portion, which adjoins the first end portion—at the end of the first end portion that faces away from the central part—and has a height above the rail that increases outward from the central part. Similarly, a fourth end portion, realized so as to be structurally identical to the third end portion, may be provided, which adjoins the second end portion.

The third and/or the fourth end portion have/has, in particular, an angle of greater than zero in relation to the first and/or second end portion, and thus a greater angle in relation to the central part than the first and/or second end portion. On the other hand, it may be realized so as to be shorter. Here, also, a radius may be provided in the transition between the first and/or the second end portion and the third and/or fourth end portion of the overhead line. The third and/or the fourth end portion are/is available for an emergency situation, in order in any eventuality to prevent the current collector from threading-in in a region above the overhead line.

In a development, in order to ensure that, as the rail vehicle enters the stop, the sliding strips of the raised current collector have a height above the rail that is at least equal to the substantially constant height of the central part of the overhead line and at most is equal to the greatest height of the raised first end portion of the overhead line above the rail, and they therefore impinge on the first end portion of the overhead line, the tolerances relating to the height of a roof of the rail vehicle above the rail, on which the current collector is disposed, relating to the height of the raised current collector above the roof of the rail vehicle, and relating to the height of the central part of the overhead line above the rail, are dimensioned such that, as the rail vehicle enters the stop, the sliding strips of the raised current collector have a height above the rail that is at least equal to the substantially constant height of the central part of the overhead line, and at most equal to the greatest height of the raised first end portion of the overhead line above the rail. The sum of said tolerances gives an overall tolerance. The latter is less than or equal to the difference from the greatest height of the raised first end portion of the overhead line above the rail and the height of the central part of the overhead line above the rail.

In the construction of the stop, yet another tolerance could possibly be taken into account, namely, that of the height of the rail above a ground surface on which the overhead line is fixed. The stop, including the overhead line, and also the rails, are fixed on a ground surface—the ground—and aligned in accordance therewith. The height of the overhead line above the rail is thus dependent on the tolerance of its fixing on the ground surface, as well as on the tolerance of the height of the rail above the ground surface. In a development, the tolerances of a height of the rail above a ground surface on which the rails are fixed, the tolerances of a height of the central part of the overhead line above the ground surface on which the overhead line is fixed, the tolerances of a height of a roof of the rail vehicle, on which the current collector is disposed, above the rail, and the tolerances of a height of the raised current collector above the roof of the rail vehicle are thus dimensioned such that, as the rail vehicle enters the stop, the sliding strips of the raised current collector have a height above the rail that is at least equal to the substantially constant height of the central part of the overhead line, and at most equal to the greatest height of the raised first end portion of the overhead line above the rail.

As described above, the current collector may be of a mechanically simple construction. In a development, its sliding strips have a maximum height difference, between and raised state, of 1000 mm, in particular of 500 mm. For example, in a raised state, it has a height above a basic frame of not more than 1500 mm, in particular of not more than 750 mm.

According to a further advantageous development of the invention, the rail vehicle has two current collectors, a first, in the region of a vehicle head, at a first end of the rail vehicle, and a second, in the region of a vehicle head, at a second end of the rail vehicle that is opposite the first. In particular, the two current collectors are of identical design and are disposed on the rail vehicle, such that the rail vehicle is of a symmetrical design with respect to the current collectors. In a development, both current collectors are raised simultaneously. The length of the central part of the overhead line in this case is greater than the distance of the first and second current collector, in particular their sliding strips, in relation to each other. Both current collectors can thus make contact with the central part of the overhead line simultaneously. This happens, in particular, in the case of stoppage in the stop, while the energy storage devices of the vehicle are being charged.

The central part has a predefined length. In relation thereto, the length of the first and/or the further end portions is relatively short. The length of the central part is dimensioned, in particular, in dependence on the distance of a plurality of current collectors on the vehicle such that at least two, in particular all, current collectors on the vehicle can be simultaneously in contact with the central part of the overhead line. It is thus somewhat longer than the distance of two adjacent current collectors of the vehicle. In particular, it is longer than the distance of the two outermost sliding strips of the outermost current collectors of the vehicle.

According to the invention, the equipment is operated with the following method steps:
  driving the rail vehicle, with the current collector raised, without contact to an overhead line;
  driving the rail vehicle, with the current collector raised, into the stop;
  establishing a galvanic contact between the raised current collector and the first end portion of the overhead line;
  traversing a transition between the first end portion of the overhead line and the central part of the overhead line while maintaining the galvanic contact between the raised current collector and the overhead line;
  advancing the rail vehicle under the central part of the overhead line, while maintaining the galvanic contact between the raised current collector and the overhead line;
  if appropriate, traversing a transition between the central part of the overhead line and a second end portion of the overhead line, while maintaining the galvanic contact between the raised current collector and the overhead line;
  driving the rail vehicle, with the current collector raised, out of the stop, and separating the galvanic contact between the raised current collector and the overhead line, in particular in the region of the second end portion;
  driving the rail vehicle, with the current collector raised, without contact to an overhead line.

Following establishment of the contact between the current collector and the overhead line, electrical energy can be transferred out of the overhead line to the rail vehicle, in particular in order to charge the energy storage devices of the rail vehicle. However, the transfer of the electrical energy out of the overhead line to the rail vehicle could also be effected only after traversing a transition between the first end portion of the overhead line and the central part of the overhead line.

The method is characterized in that, before entering the stop, the rail vehicle travels with the current collector raised, without having contact to an overhead line, and travels into and back out from the stop with the current collector raised. The current collector in this case is raised to precisely such an extent that the height of the sliding strips over the rail is greater than the height of the central part over the rail and less than the height of the end of the first end portion over the rail. In particular, however, the current collector is raised precisely to such an extent, not only when entering the stop, but also during the entire journey of the rail vehicle in the predefined route network. In particular, the current collector is raised during the normal operation of the rail vehicle.

As a result of traveling with a permanently raised current collector—at least in normal operation—the latter can be of a simplified design, resulting in significant cost savings in comparison with solutions known hitherto.

The loading on the current collector caused by many raising/lowering cycles is avoided. This problem has arisen because of the requirements of operation without a contact wire, in which the energy storage devices inside the vehicle are charged via the overhead line, or overhead contact rail, at the stops, and between the stops the rail vehicle is operated without an overhead line. The special entry ramp and exit ramp of the overhead line in this case enable the current collector to thread-in and thread-out autonomously. Furthermore, the design of the current collector can include a very low working height, enabling travel in the raised state. All relevant tolerances, of infrastructure, vehicle, overhead line and current collector, must be included in this case.

If two current collectors are provided on the vehicle, this applies to both current collectors. The method would then have the following method steps:

- driving the rail vehicle, with the first and the second current collector raised, without contact to an overhead line;
- driving the rail vehicle, with the current collectors raised, into the stop;
- establishing a galvanic contact between the first raised current collector and the first end portion of the overhead line, and if appropriate transferring electrical energy from the overhead line to the rail vehicle;
- traversing a transition between the first end portion of the overhead line and the central part of the overhead line while maintaining the galvanic contact between the raised first current collector and the overhead line;
- transferring electrical energy from the overhead line to the rail vehicle;
- advancing the rail vehicle while maintaining the galvanic contact between the raised first current collector and the central part of the overhead line;
- establishing a galvanic contact between the raised second current collector and the first end portion of the overhead line, and if appropriate transferring electrical energy from the overhead line to the rail vehicle;
- traversing a transition between the first end portion of the overhead line and the central part of the overhead line while maintaining the galvanic contact between the raised second current collector and the overhead line, and if appropriate while maintaining the transfer of electrical energy from the overhead line to the rail vehicle;
- advancing the rail vehicle while maintaining the galvanic contact between the raised second current collector and the central part of the overhead line;
- if appropriate, traversing a transition between the central part of the overhead line and a second end portion of the overhead line, while maintaining the galvanic contact between the raised first current collector and the overhead line;
- driving the rail vehicle, with the first current collector raised, out of the stop, and separating the galvanic contact between the raised first current collector and the overhead line, in particular in the region of the second end portion;
- if appropriate, traversing a transition between the central part of the overhead line and a second end portion of the overhead line, while maintaining the galvanic contact between the raised second current collector and the overhead line;
- driving the rail vehicle, with the second current collector raised, out of the stop, and separating the galvanic contact between the raised second current collector and the overhead line, in particular in the region of the second end portion;
- driving the rail vehicle, with the current collectors raised, without contact to an overhead line.

The traversing of a transition between the first end portion of the overhead line and the central part of the overhead line while maintaining the galvanic contact between the raised first current collector and the overhead line, and if appropriate while maintaining the transfer of electrical energy from the overhead line to the rail vehicle. The driving of the rail vehicle, with the first current collector raised, out of the stop, and separating the galvanic contact between the raised first current collector and the overhead line is effected, in particular, while maintaining the galvanic contact between the raised second current collector and the overhead line, and if appropriate while maintaining the transfer of electrical energy from the overhead line to the rail vehicle.

According to a development of the invention, electrical energy is transferred from the overhead line to the rail vehicle only when the transition has been made between the first end portion of the overhead line and the central part of the overhead line, and a galvanic contact has thus been established between the raised first and/or second current collector and the central part of the overhead line. Similarly, the transfer of electrical energy from the overhead line to the rail vehicle ends before the transition has been made between the central part of the overhead line and the second end portion of the overhead line. For this purpose, for example, the first and/or the second end portion are/is electrically connected to the energy storage device, in particular via a switch or via a respective switch. This switch serves to control the flow of energy. A corresponding method is described farther below.

Between the rail vehicle being driven, with the first current collector raised, out of the stop, and separation of the galvanic contact between the raised first current collector and the overhead line, and the rail vehicle being driven, with the second current collector raised, out of the stop, and separation of the galvanic contact between the raised second current collector and the overhead line, the rail vehicle, for example also the energy storage devices thereof, is thus supplied with electrical energy from the overhead line via the second current collector that is then still in galvanic contact with the overhead line. This electrical energy is also used, in particular, for accelerating the rail vehicle, and is used directly in the drive units of the rail vehicle, in particular without buffering.

In a development, before the establishing of a galvanic contact between the first and/or second raised current collector and the overhead line, and/or before the separating of the galvanic contact between the first and/or second raised current collector and the overhead line, a travel voltage is converted to at least the value of a predefined supply voltage of the contact wire. The travel voltage is provided from an electrical energy obtained from the energy storage device.

For this purpose, in a development, the rail vehicle has at least one electrical component that is designed to raise or lower, i.e. to convert, the travel voltage at least to the value of the predefined supply voltage of the overhead line that differs, at least in amount, from the travel voltage. Normally, the travel voltage is lower. Thus, in particular, the travel voltage is raised.

The overhead line, as part of the route network for supplying the rail vehicle with energy, or also called the supply network, in this case is at a predefined supply voltage, for example 900 V. Clearly, the voltage is measured relative to the ground potential.

The energy storage device serves to store and deliver electrical energy for driving the rail vehicle and for driving the other loads (auxiliary drives, air conditioning, etc.), at least during so-called operation without an overhead line. The drive energy is delivered to corresponding drive units of the rail vehicle, for example drive motors. During travel operation it serves as an electrical energy source. The energy storage device preferably comprises one or more capacitors, in particular so-called super-capacitors, also ultra-capacitors, and/or one or more battery cells. Super-capacitors are mostly composed of double-layer capacitors. A unit composed of a plurality of battery cells is occasionally also referred to as a traction battery, traction accumulator, drive battery or cycle battery, and in principle is rechargeable. A combination of both is considered to be advantageous. The energy storage device then comprises at least one capacitor and at least one battery.

The energy storage device usually delivers the electrical energy in the case of a source voltage that to some extent varies and is possibly dependent on the charge state. The travel or traction voltage is provided from an electrical energy obtained from the energy storage device. A step-up/step-down converter, for example, is provided for this purpose. In particular, the rail vehicle has an intermediate circuit—the travel voltage then corresponds to the intermediate circuit voltage, the energy storage device feeding the intermediate circuit during operation without an overhead line. The step-up/step-down converter serves to convert the varying source voltage to a predefined, approximately constant travel or intermediate circuit voltage.

The current collector is electrically connected to the energy storage device, at least during the transfer of electrical energy from the overhead line to the vehicle, such that current can flow from the overhead line, through the current collector, to the energy storage device. In particular, it is connected to the intermediate circuit.

The current collector is electrically connected to the energy storage device, in particular via a switch. If the switch is closed and the current collector is connected to the overhead line, energy can flow from the overhead line, through the current collector, into the energy storage device.

If, on the other hand, the switch is closed and the current collector is not connected to the overhead line, then, while the rail vehicle is being driven by means of electrical energy from the energy storage device, the current collector connected to the energy storage device is also at the corresponding potential—the drive voltage is applied to it also. Preferably, the switch is open during operation without an overhead line.

The travel voltage is, for example 750 V, again measured relative to the ground potential.

In the above-mentioned example, the voltage would be raised by the electrical component, in particular by the step-up/step-down converter, from 750 V to 900 V.

Alternatively, the electrical component may be, for example, an energy source that is supplementary to the energy storage device, in particular a supplementary battery, that is connected in series, for example, to the energy storage device, and that in particular serves exclusively to raise the travel voltage to the supply voltage, or it is a power converter, in particular a d.c. chopper converter. In the field of energy engineering and rail vehicles, d.c. chopper converters refer to d.c.-d.c. converters that convert a d.c. voltage, at an input, into a d.c. voltage having a higher, lower or inverted voltage level. This may be effected by means of a periodically operating electronic switch and one or more energy storage devices. Also a possibility, as a special form of the d.c. chopper converters, is the step-up converter. It is a synchronous converter, which converts a lesser input voltage, in this case the travel voltage, into a greater output voltage, in this case the supply voltage.

A further power converter, in particular a pulse-controlled inverter, serves to supply and control the drive units of the rail vehicle, and is therefore also referred to as a drive system converter. Depending on the type of drive and the energy supply, it is a frequency converter or an inverter, for example for converting a d.c. voltage into a three phase rotary current system for supplying the drive motors. It is likewise connected to the intermediate circuit.

A voltage difference exists between the travel voltage and the supply voltage. If the current collector were to make contact with the overhead line without this voltage difference being compensated by the electrical component, an electric arc would occur because of the voltage difference. This arc, in turn, would contribute to wear on the sliding strips of the current collector and on the overhead line. The electrical component for voltage conversion thus contributes to the avoidance of electric arcs.

Electric arcs only occur if a current is flowing. Compensating the voltage difference at the instant of establishing and at the instant of separating the contact between the current collector and the overhead line ensures that no current can flow, and thus arc-free operation is ensured. In addition, an anti-feedback diode may also be provided on the route. This is described in greater detail farther below.

In a development, the instant of conversion of the travel voltage to the level of the supply voltage is determined by means of a location signal or control signal. This could also include a self-calculated route distance traveled by the vehicle, which is measured, for example, on a wheel of a running bogie that is not itself driven.

A development of the invention provides that the rail vehicle has a receiving unit for receiving a control signal, which receiving unit is designed to receive a control signal from at least one signal generator that is external to the rail vehicle, and to control the electrical component for voltage conversion in dependence on the received signal. The signal generator in this case may be disposed in a fixed manner in the region of the overhead line, for example a location marker in the track a short distance before the stop having the overhead line.

The signals of a satellite system, in particular a global navigation satellite system such as GPS, Galileo, GLONASS or Beidou, may also serve as a control signal. In this exemplary embodiment, the receiving unit is a receiver of a global navigation satellite system. The receiving unit must accordingly be realized so as to be suitable for receiving and evaluating the signals. Evaluation of the received signals results in instantaneous location coordinates of the rail vehicle. In the case of a predefined location of the rail vehicle, the receiving unit controls the electrical component for voltage conversion. The predefined location has, in particular, a predefined distance from the overhead line, in the direction of travel. Thus if, for example, the rail vehicle is a short distance from entering a stop that has the overhead line, the travel voltage is adjusted up, to avoid an electric arc.

The duration of the conversion of the travel voltage, applied to the first current collector, to the level of the supply voltage of the overhead line, and/or the reconversion of the supply voltage of the overhead line, applied to the first current collector, to the travel voltage, is determined by the distance traveled by the rail vehicle and/or by a predefined time interval. The distance traveled may be measured, for example, on a wheel of a running bogie that is not itself driven.

A further development consists in that the rail vehicle has two current collectors, a first current collector in the region of a first vehicle head, at a first end of the rail vehicle, and a second current collector, in the region of a second vehicle head, at a second end of the rail vehicle that is opposite the first. At least the first current collector in this case may be connected to the energy storage device via a switch. It is also possible for both current collectors to be connected to the energy storage device via one, two or more switches.

In a development, between the overhead line in the region of the stop and a substation, there is at least one further, second electrical component, which allows current to pass in a substantially unhindered manner in the direction of the overhead line, and acts in an isolating manner in the direction of the substation in order to prevent a flow of current. The substation serves as a connection between an energy source and the overhead line. It is equipped, for example, with rectifiers for generating a d.c. voltage. Moreover, it is designed to generate the predefined supply voltage applied to the overhead line.

The further, second electrical component may be referred to generally as a diode. In the following, it is referred to as an anti-feedback diode. It is open in the direction of the overhead line and blocks in the direction of the electric power supply. It thus prevents the flow of energy from the rail vehicle to the route network, or supply network. Thus, there is no energy lost from the energy storage device into the route network.

According to a development of the route network according to the invention, the overhead line is realized as a fixed overhead contact rail.

A further development of the route network consists in that it comprises a signal generator that, in particular in the direction of travel, is disposed at a predefined distance from the overhead line and that is designed so as to be suitable for sending a control signal in a predefined form to the rail vehicle and transmitting it to the rail vehicle.

The signal generator in this case may be fixed, for example a location marker in the track before the stop having the overhead line, or it is one or more satellites of a global navigation satellite system such as GPS, Galileo, GLONASS or Beidou. The signal generator serves, in particular, to transmit location information to the rail vehicle. It could thus also be referred to as a location information generator.

The signal generator is realized, in particular, to complement the receiving unit of the rail vehicle, and must accordingly be realized so as to be suitable for generating at least one signal and emitting it to the receiving unit. The signal of a fixed signal generator, for example of a location marker in the track, is already location-based per se—it is only at this location that it can be emitted by the signal generator and received by the receiving unit of the rail vehicle. It does not necessarily require further location information encoded in the signal. Signals from other signal generators have, in particular, location coordinates, or the instantaneous location coordinates of the rail vehicle can be derived therefrom by the receiving unit. The signal generator is accordingly designed to generate and emit such a signal.

For the purpose of avoiding electric arcs, besides the stated method steps a method according to the invention for operating an equipment according to the invention may comprise the following method steps:

driving the rail vehicle, with the current collector extended, into the stop, without contact to the overhead line, by means of energy from the energy storage device of the rail vehicle;

raising the travel voltage from a predefined value to at least the value of the predefined supply voltage of the contact wire;

establishing a galvanic contact between the extended current collector and the overhead line, and transferring electrical energy from the overhead line to the rail vehicle;

driving the rail vehicle, with the current collector extended, out of the stop, and separating the galvanic contact between the extended current collector and the overhead line;

lowering the travel voltage to the previous, predefined value;

advancing by means of energy from the energy storage device of the rail vehicle.

The method is used especially to operate a rail vehicle according to the invention in a route network having at least one overhead contact rail as an overhead line in the region of a stop. The rail vehicle then has at least one correspondingly suitable current collector on the roof of the rail vehicle.

In the region of the stop, and in the immediate surroundings thereof, the current collector is in the extended position, in particular the current collector is in the extended position during the entire normal operation of the rail vehicle. The current collector is extended in its working position, in order to make contact with the overhead line and to establish a galvanic connection to the latter, including when, as here, there need not necessarily be an overhead line present. If an overhead line is present, the current collector is said to be clipped-on. If the overhead line is a contact rail that runs beside or beneath the rail vehicle, the current collector is in the extended position when, in its working position, it is ready to establish a contact with the contact rail—in the presence of the contact rail, the current collector is guided in a sliding manner on, beside or under the contact rail. In each case, a galvanic connection can be established between the current collector, in particular its sliding strips, and the overhead line.

In the case of a developed method, a control signal from a signal generator is acquired, and the travel voltage is raised from the predefined value to at least the value of the predefined supply voltage of the contact wire. Alternatively or additionally, a control signal from a signal generator is acquired, and the travel voltage is lowered, in dependence on the control signal, from at least the value of the predefined supply voltage of the contact wire to the predefined value.

Before the rail vehicle, with the current collector extended, is driven out of the stop, there is usually a stoppage of the rail vehicle in the stop, with maintenance of the galvanic contact between the first and/or the second current collector and the overhead line, in particular with maintenance of the galvanic contact between the first and the second current collector and the overhead line.

If both current collectors are simultaneously in galvanic contact with the overhead line, electrical energy can be effected from the overhead line to the rail vehicle, by means of both current collectors, or exclusively by means of the first or the second extended current collector. Preferably, at least when the rail vehicle is in the stopped state, energy is transferred from the overhead line to the rail vehicle by means of both current collectors. In order to control the transfer of energy via the current collector, at least the first current collector may be connected to the energy storage device via a switch. In a development, each of the two current collectors may be connected to the energy storage device of the rail vehicle via a switch, and can thus be switched on and off.

Both the opening and closing of the switches, and the establishing and separating of the galvanic connections between the current collectors and the overhead line, are in each case effected without load, or without current, and thus without arcing.

If a rail vehicle is operated with two current collectors, wherein, in particular, a first current collector is disposed, in the region of a first rail vehicle head, at a first end of the rail vehicle, and a second current collector is disposed, in the region of a second rail vehicle head, at a second end of the rail vehicle that is opposite the first end, the method, in a development, may comprise the following method steps:
  driving the rail vehicle, with the first and the second current collector extended, into the stop, without a contact to the overhead line, by means of energy from the energy storage device of the rail vehicle;
  if appropriate, acquiring a control signal from a first signal generator;
  raising the travel voltage to at least the value of the predefined supply voltage of the overhead line, if appropriate in dependence on the control signal;
  if appropriate, closing an opened switch between the first current collector and the energy storage device;

The last two method steps could also be interchanged. What is important is that, in the following method step, a voltage having at least the value of the predefined supply voltage of the overhead line is applied to the current collector. There follows:
  establishing a galvanic contact between the first extended current collector and the overhead line;
  lowering the travel voltage to the previous, predefined value;
  transferring electrical energy from the overhead line to the rail vehicle, in particular by means of the first extended current collector;
  advancing the rail vehicle, while maintaining the galvanic contact between the extended first current collector and the overhead line, and thus, in particular, advancing by means of the energy transferred from the overhead line to the rail vehicle, in particular by means of the first extended current collector;
  stopping, while maintaining the galvanic contact between the extended first current collector, and while maintaining the transfer of electrical energy from the overhead line to the rail vehicle;

Before the last method step, the following method steps could be effected:
  if appropriate, acquiring a further control signal from the first signal generator, or determining a distance traveled by the rail vehicle since the control signal, and calculating a further control signal;
  raising the travel voltage to at least the value of the predefined supply voltage of the overhead line, if appropriate in dependence on the control signal;
  if appropriate, closing an opened switch between the second current collector and the energy storage device;
  establishing a galvanic contact between the second extended current collector and the overhead line;
  lowering the travel voltage to the previous, predefined value;
  transferring electrical energy from the overhead line to the rail vehicle;

Here also, as above, the raising of the voltage and the closing of the switch could be interchanged. It is also possible, however, that the opened switch between the second current collector and the energy storage device is not closed until during the stoppage of the vehicle. For this purpose, again, the travel voltage must first be raised.

Prior to the vehicle being driven out, again the switch between the first current collector and the energy storage device could be opened. As a result, the flow of current is commuted to the second current collector. There follows:
  driving the rail vehicle, with the first and the second current collector extended, out of the stop;
  advancing the rail vehicle, while maintaining the galvanic contact between the extended second current collector and the overhead line, and thus, in particular, advancing by means of the energy transferred from the overhead line to the rail vehicle, in particular by means of the second extended current collector;
  if appropriate, acquiring a further control signal from the second signal generator, or determining a distance traveled by the rail vehicle since the control signal, and calculating a further control signal;
  raising the travel voltage to at least the value of the predefined supply voltage of the overhead line, if appropriate in dependence on the control signal;
  if appropriate, opening the closed switch between the second current collector and the energy storage device;
  separating the galvanic contact between the second extended current collector and the overhead line;
  lowering the travel voltage to the previous, predefined value, and advancing by means of energy from the energy storage device of the rail vehicle.

The separating of the galvanic contact between the second extended current collector and the overhead line is then again effected without load, and for this reason has not been presented further here.

Alternatively, there may follow:
  driving the rail vehicle, with the first current collector extended, out of the stop;
  if appropriate, acquiring a further control signal from a further, second signal generator;
  if appropriate, opening the closed switch between the first current collector and the energy storage device;
  raising the travel voltage to at least the value of the predefined supply voltage of the overhead line, if appropriate in dependence on the control signal;
  separating the galvanic contact between the first extended current collector and the overhead line;
  lowering the travel voltage to the previous, predefined value and, if appropriate, transferring electrical energy from the overhead line to the rail vehicle, in particular by means of the second extended current collector;
  advancing the rail vehicle, while maintaining the galvanic contact between the extended second current collector and the overhead line, and thus, in particular, advancing by means of the energy transferred from the overhead line to the rail vehicle, in particular by means of the second extended current collector;
  if appropriate, acquiring a further control signal from the second signal generator, or determining a distance traveled by the rail vehicle since the control signal, and calculating a further control signal;
  raising the travel voltage to at least the value of the predefined supply voltage of the overhead line, if appropriate in dependence on the control signal;
  if appropriate, opening the closed switch between the second current collector and the energy storage device;
  separating the galvanic contact between the second extended current collector and the overhead line;

lowering the travel voltage to the previous, predefined value, and advancing by means of energy from the energy storage device of the rail vehicle.

In principle, the method described above applies to each current collector individually.

The invention allows numerous embodiments. It is explained in greater detail on the basis of the following figures, in each of which an exemplary embodiment is represented. Elements that are the same in the figures are denoted by the same references.

BRIEF DESCRIPTION OF THE SEVERAL VIEWS OF THE DRAWING

FIGS. 6 to 14 show, in schematic form, the rail vehicle according to the invention entering and exiting the stop.

DESCRIPTION OF THE INVENTION

Figure 1:
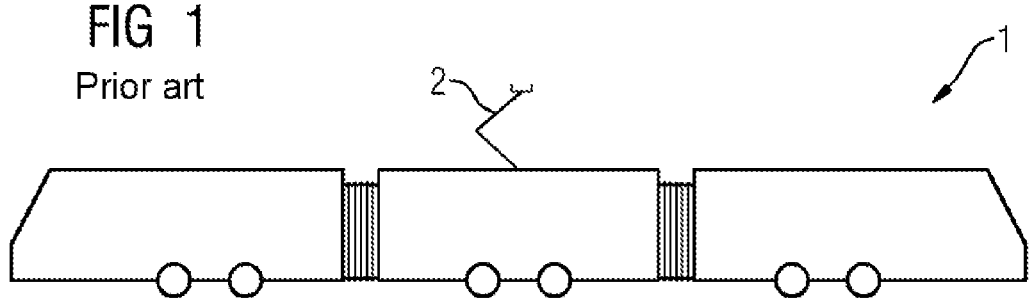
FIG. 1 shows, in schematic form, a rail vehicle of the prior art, having a conventional current collector.
Figure 2:
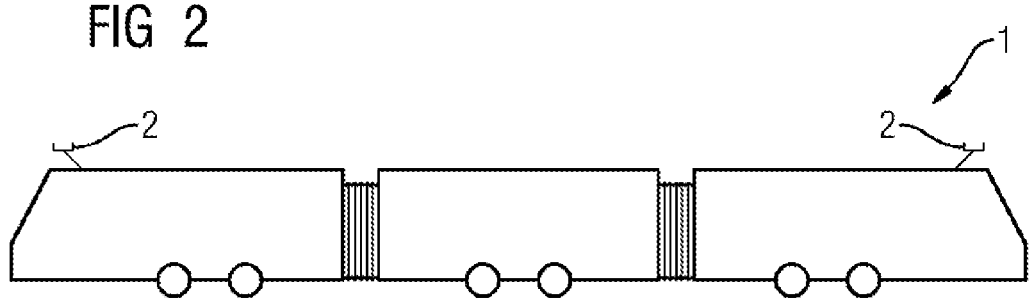
FIG. 2 shows, in schematic form, a rail vehicle according to the invention.

Represented in FIG. 1 is a rail vehicle 1 of the prior art, having a centrally arranged, conventional single-arm current collector 2 on the roof of the rail vehicle for making contact with a fixed overhead line. For comparison, FIG. 2 shows a rail vehicle 1 according to the invention, in this case a local public transport low-platform rail vehicle that has two significantly smaller current collectors 2 according to the invention. The latter are arranged and designed to establish galvanic connection to a fixed overhead conductor rail as a stationary overhead line 3.

Figure 3:
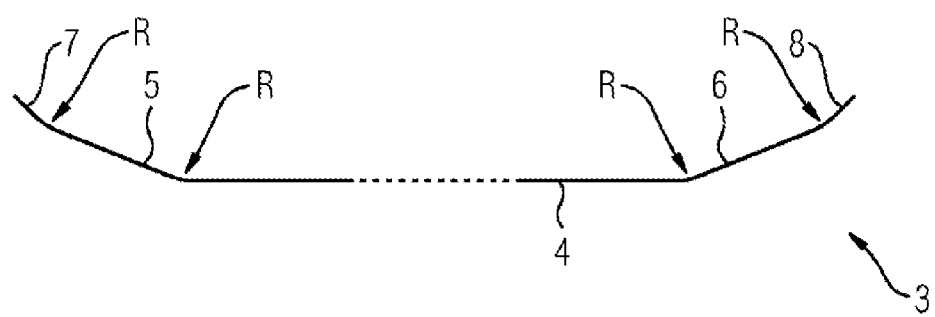
FIG. 3 shows, in schematic form, an overhead line according to the invention.

The overhead line 3 according to the invention, realized to complement the rail vehicle, is illustrated in the schematic representation of FIG. 3. It is embodied as a fixed conductor rail. It could therefore also be referred to as an overhead conductor rail. In general, an overhead line is called a contact line, contact wire, or overhead contact wire or conductor rail. The overhead line 3 is elbowed on both sides. On a first side of a central part 4, adjoining the latter, it has a first end portion 5, and on the opposite, second side of the central part 4 it has a second end portion 6, in this case structurally identical, that similarly adjoins the latter. The two end portions 5 and 6 form entry and exit ramps.

The end portions 5 and 6 each have a straight course. Provided in each case between the respective end portions 5 and 6 and the central part 4 there are radii that allow a steady transition from the respective end portions 5 and 6 to the central part 4. The end portions 5 and 6 have predefined, and in this case equal, angles, in relation to the central part 4, and lengths. The angles ensue in dependence on the impact speed and impact forces, and the strength of the current collectors and sliding strips of the rail vehicle. The end portions 5 and 6 thus have the greatest distance from the central part 4 at the end that faces away from the central part 4.

Since the central part 4 has a substantially constant, predefined height above the rail, and the first and the second end portion 5 and 6 have a height above the rail that increases outward from the central part, the end portions 5 and 6 have the greatest height above the rail, not illustrated in greater detail here, at the end that faces away from the central part 4.

Provided in this exemplary embodiment is a further, third end portion 7, which adjoins the end of the first end portion 5 that faces away from the central part 4, and a fourth end portion 8, which is identical to the third end portion 7 and which, in similar manner, adjoins the second end portion 6. Their angles in relation to the central part 4 are greater than the angles of the first and second end portions 5 and 6. On the other hand, their lengths are considerably shorter than the first and second end portions 5 and 6. The third and the fourth end portion also are connected to the first and second end portion respectively by means of transition elbows having predefined radii. The third and the fourth end portion 7 and 8 serve, principally in an emergency, in order in any eventuality to prevent the current collector from threading-in in a region above the overhead line.

This is because, normally, the current collector of the rail vehicle threads-in in the first or second end portion 5 and 6 of the overhead line 3. For this purpose, the raised current collector of the rail vehicle and the overhead line are realized and matched to each other such that, as the rail vehicle enters the stop, sliding strips of the current collector have a height above the rail that is at least equal to the substantially constant height of the central part 4 of the overhead line, and that is at most equal to the greatest height of the raised first and/or second end portion 5 and/or 6 of the overhead line above the rail.

Figure 4:
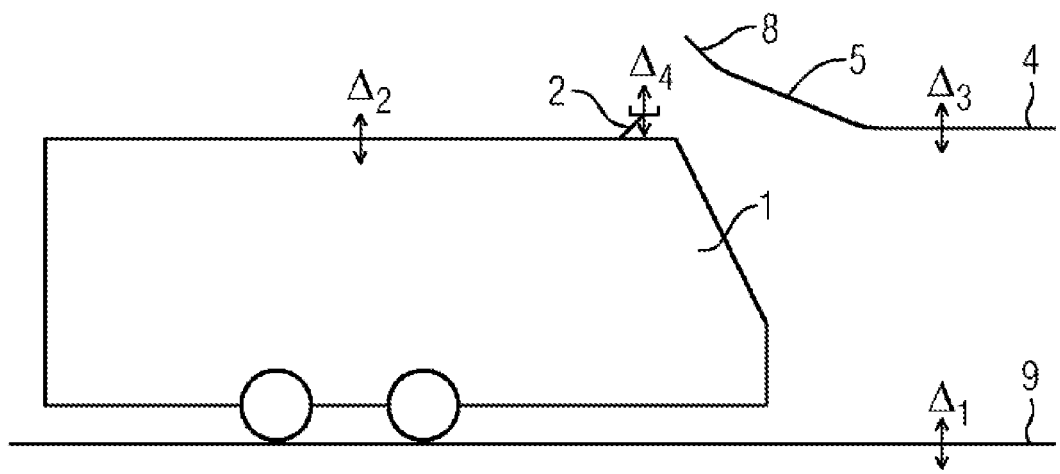
FIG. 4 shows, in schematic form, the rail vehicle according to the invention as it enters a stop.
Figure 5:
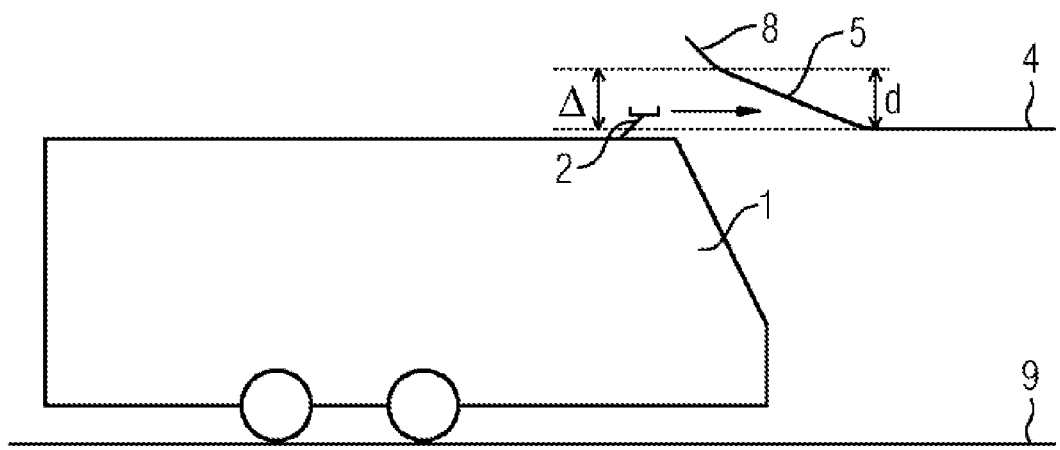
FIG. 5 shows, in schematic form, the rail vehicle according to the invention as it enters a stop.

For this purpose, in particular, the tolerances indicated schematically in FIG. 4 must be taken into account and included for the tolerance chain. FIG. 5 in this case illustrates the impinging of the current collector in the admissible ramp range of the first end portion 5, with all tolerances Δ being taken into account.

The tolerance chain Δ, of infrastructure Δ1, vehicle Δ2, overhead line Δ3 and current collector Δ4, is dimensioned such that the current collector always impinges in the region of the first or second end portion 5 or 6, the tolerance Δ being less than or equal to the total height of the first or second end portion 5 or 6, relative to the central part 4.

Δ1 in this case denotes the tolerances of a height of a rail 9 above a ground surface at which the rails 9 are fixed. Δ3 denotes the tolerances of a height of the central part 4 of the overhead line above the ground surface at which the overhead line is fixed. Δ2 denotes the tolerances of a height of a roof of the rail vehicle 1 above the rail 9, on which roof the current collector 2 is disposed. And finally, Δ4 relates to the tolerances of a height of the raised current collector 2 above the roof of the rail vehicle 1. These tolerances are dimensioned such that, as the rail vehicle 1 enters the stop, the sliding strips of the raised current collector 2 have a height above the rail 9 that is at least equal to the substantially constant height of the central part 4 of the overhead line, and that is at most equal to the greatest height of the raised first end portion 5 of the overhead line above the rail 9.

FIG. 6 to FIG. 14 show a method according to the invention for operating the rail vehicle.

As shown in FIG. 6, the rail vehicle is operated with two very low current collectors, which are raised, even between two stops, and which are disposed on the vehicle roof, in the region of the respective opposite ends of the vehicle. The current collectors remain raised during the normal operation of the rail vehicle. The current collector design includes a very short structure with a very low working height.

Shortly before entering a stop having an overhead line, the vehicle obtains location information, as a control signal, in this case via a receiving unit 13 of a navigation satellite system (FIG. 7). A braking operation is initiated in dependence on this control signal.

This is followed by the rail vehicle entering the stop with the first and second current collectors raised, and a galvanic contact being established in a non-arcing manner between the first raised current collector and the first end portion of the overhead line, and electrical energy being transferred from the overhead line to the rail vehicle.

The current collector in this case can thread-in autonomously via the entry ramp of the overhead line, or overhead conductor rail. This is illustrated schematically in the detail view of FIG. 8.

The establishing of the contact in a non-arcing manner is effected by the compensation, described further below, of the voltage difference between the travel voltage and the supply voltage, by converting the travel voltage to or above the level of the supply voltage, and preventing a flow of energy from the vehicle to the route network.

Then, the rail vehicle travels on, maintaining the galvanic contact between the raised first current collector and the central part of the overhead line and, as shown in FIG. 9, a non-arcing galvanic contact is established between the raised second current collector and the first end portion of the overhead line, and electrical energy is transmitted from the overhead line to the rail vehicle. Here, the establishing of the non-arcing contact is effected in an identical manner to the contact between the first current collector and the overhead line.

Then (FIG. 10), the rail vehicle is stopped in the stop, maintaining the galvanic contact of both raised current collectors and the central part of the overhead line, and maintaining the transmission of electrical energy from the overhead line to the rail vehicle, in particular for the purpose of charging the electrical energy storage device of the rail vehicle.

After the stoppage, the rail vehicle advances out of the stop (FIG. 11). The rail vehicle is accelerated, but advantageously by means of energy from the overhead line, and not from the energy storage device on the rail vehicle. First, the galvanic contact between the raised first current collector and the overhead line in the region of the second end portion is separated without load (FIG. 12). Owing to the load-free separation, an electric arc is avoided. The exit ramp of the overhead line, or of the overhead conductor rail, in this case enables the current collector to move autonomously out of the latter. In the process, the galvanic contact between the raised second current collector and the central part of the overhead line, and consequently the transmission of electrical energy from the overhead line to the rail vehicle, is maintained. The second current collector alone thus performs the function of supplying the rail vehicle. It is only when the galvanic contact between the raised second current collector and the overhead line, in the region of the second end portion, is separated without load (FIG. 13), that the energy storage device of the vehicle takes over the function of supplying the drive systems and auxiliary drives of the rail vehicle. The rail vehicle again travels on, with raised current collectors, to the next stop (FIG. 14).

In order to separate the current collectors without load, the drive voltage is again converted, or in particular raised, at least to or above the level of the supply voltage, in a manner analogous to the establishing of the contact.

According to the invention, operation without a contact wire, with a permanently raised current collector, is effected with a very low working height. The following aspects in this case play an important role:

As compared with conventional current collectors, the current collectors are significantly reduced in size. As a result, the mechanics are simplified (absence of "knee joint") and, moreover, the esthetic appearance of the rail vehicle is improved.

Autonomous "threading-in" of the current collector, from sections without a contact wire into sections spanned by a contact wire, by means of ramped end portions and tolerance specifications with defined maximum speeds.

Avoidance of arcing during entry and exit.

Owing to the permanently raised current collectors, there is no need for lifting/lowering cycles that burden the drive. It is possible to dispense with regular changing of the drives, and a decline in reliability, caused by failing drives, is avoided.

It is possible to use an inexpensive electrical standard current-collector drive. Since entry is effected with a raised current collector, a network connection is established very rapidly, enabling a charging operation to begin as soon as possible for the energy storage devices inside the vehicle. This enables stopping times to be kept to a minimum.

On the other hand, during exit, a network connection that lasts as long as possible is achieved. Consequently, the acceleration operation can be effected for a maximum length of time via the overhead line supply. This means sparing of the energy storage devices, and consequently a prolonged service life. The vehicle leaves the charging station with a maximum energy content.

Figure 15:
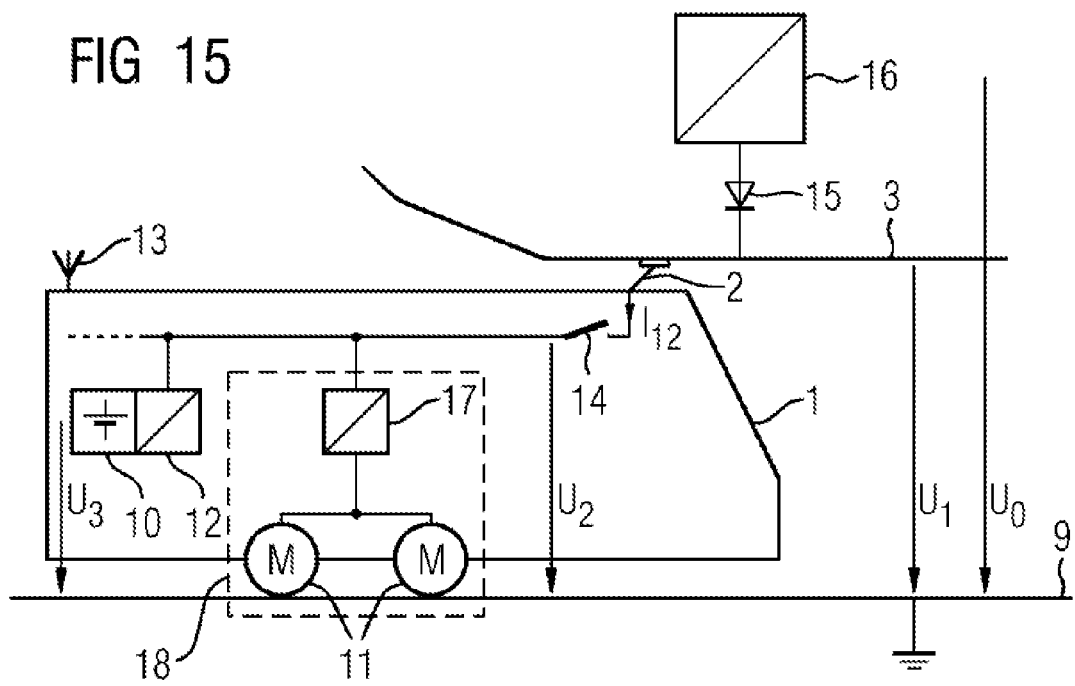
FIG. 15 shows a block diagram of a vehicle according to the invention and a portion of a route network according to the invention.

Represented in FIG. 15 is a schematic block diagram of a vehicle 1 according to the invention and a region of a stop of a route network according to the invention. The route network has a contact wire 3 of limited length, realized as an overhead contact rail in the region of the stop.

The function of supplying electric power to the contact wire 3 is performed by a transformer substation 16, also called a substation. In order to avoid electrical energy being fed back out of the vehicle 1 into the contact wire 3, there is a further electrical component 15, provided between the transformer substation 16 and the contact wire 3, which allows electric current to pass in the direction of the contact wire 3 and acts as an isolator in the direction of the transformer substation 16—a so-called anti-feedback diode.

The vehicle 1 is a rail vehicle that travels on at least one rail 9 and is guided by the latter. The rail 9 in this case could serve simultaneously to deflect electric currents into the ground, and thus to effect potential equalization. The rail 9 is at earth (ground) potential. However, the rails could also insulate against the ground, and serve to transfer the current to the substation, where the grounding is effected.

Disposed on the roof of the vehicle 1 there is a current collector 2 for transferring electrical energy from the contact wire 3 to the vehicle. The vehicle 1 additionally comprises an energy storage device 10 for providing electrical energy for driving the vehicle. The energy storage device 10 is connected to the current collector 2 via a switch 14. The connection serves primarily to charge the energy storage device 10, from the contact wire 3, with electrical energy that is carried from the current collector 2 to the energy storage device 10.

The vehicle furthermore has at least one electrical component 12 that is designed to convert a source voltage U3, built up by the energy storage device 10, into a predefined travel voltage U2 and into a predefined supply voltage U1 of the contact wire 3. Here, the component 12 is a step-up/step-down converter. The voltage ratings in each case are relative to the ground potential of the rail 9, and differ in their magnitude. The contact wire and the current collector are thus at differing voltage levels—the travel voltage and the supply voltage differ when there is no connection.

While the vehicle is being driven by energy from the energy storage device, the travel voltage U2 is applied before the switch 14, and also to the current collector when the switch 14 is closed.

The electrical component 12 is suitable for converting, i.e. raising and/or lowering, the travel voltage during travel by means of energy from the energy storage device 10, to the value of the supply voltage U1 that is applied to the contact wire 3.

Here, a step-up/step-down converter is provided as an electrical component 12 and connected to the energy storage device 10 in order to compensate, at least briefly, the voltage difference between the travel voltage and the supply voltage of the contact wire 3.

The energy storage device thus comprises the energy storage device 10 and the electrical component 12 for voltage conversion.

The power converter is realized so as to be controllable by closed-loop control. Open-loop control is effected via a receiving unit 13 for receiving and evaluating location information and for closed-loop control of the power converter in dependence on the location information. Here, the receiving unit 13 is set up to determine, and is able to determine, the position of the instantaneous location coordinates of the vehicle in a predefined coordinate system on the basis of signals from a navigation satellite system.

Besides the power converter of the energy storage device, the vehicle has a further power converter 17, by means of which drive motors, as drive units 11 of the vehicle, are electrically connected both to the energy storage device 10 and to the current collector 2. It serves to supply and control the drive units of the vehicle 1, and is therefore also called a drive converter. Here, it is a power inverter. The second power converter 17 is assigned thereto—the drive system 18, in a manner similar to the energy storage device, is composed of the drive motors, as drive units 11, and the second power converter 17.

Thus, in the present case, the conversion of the travel voltage U2 to the value of the predefined supply voltage U1 of the contact wire 3 may be regarded as an adaptation of the intermediate circuit voltage.

Before the intermediate circuit voltage is raised or lowered, a control signal is acquired by means of a receiving unit 13, and thereupon the input power converter is controlled such that the intermediate circuit voltage is raised or lowered to or above the predefined level of the supply voltage. The control signal originates from at least one signal generator that is external to the vehicle.

The determination of the exact instant of conversion of the travel voltage to the level of the supply voltage may also include a self-calculated route distance traveled by the vehicle, which is measured, for example, on a wheel of a running bogie that is not itself driven, in particular from the instant of acquisition of the control signal by the receiving unit 13.

The signal generator in this case may be disposed in a fixed manner in the region of the contact wire, for example a distance marker, braking marker or location marker in the track a short distance before the stop having the contact wire 3.

Here, the receiving unit 13 receives and evaluates data of a navigation satellite system. It is designed so as to be correspondingly complementary thereto. Moreover, it is suitable for processing said data and for controlling the electrical component 12.

Between two sections of the route network having the contact wire 3, i.e. in particular between two stops, the vehicle 1 is driven with energy from the energy storage device 10. Provided in this case is a travel or intermediate circuit voltage of a predefined amount that differs from an amount of the supply voltage of the contact wire 3.

In order to avoid electric arcs, shortly before the current collector 2 makes contact with the contact wire 3, the travel voltage or intermediate circuit voltage is increased at least to or above the amount of the supply voltage. The voltage is lowered again for the purpose of charging the energy storage device.

The invention claimed is:

1. A rail system, comprising:
an overhead line in a region of a stop for a rail vehicle;
at least one rail vehicle having a first end with a first vehicle head and a second end, opposite said first end, with a second vehicle head;
first and second current collectors having sliding strips for making contact with said overhead line, said first current collector being disposed at said first vehicle head and said second current collector being disposed at said second vehicle head;
said overhead line having a central part with a limited, predefined length and a first end portion adjoining said central part on at least one side thereof, said central part having a substantially constant predefined height above a rail for said rail vehicle, and said first end portion having a height above the rail that increases outward from said central part;
said current collectors of the rail vehicle are raised and matched to the overhead line such that, as the rail vehicle enters the stop, sliding strips of the current collectors have a height above the rail that is at least equal to the substantially constant height of the central part of said overhead line, and at most equal to a greatest height of said raised first end portion of said overhead line above the rail;
wherein a length of said central part of said overhead line is greater than a spacing distance of said sliding strips of said first and second current collectors from one another; and wherein:
  tolerances of a height of the rail above a ground surface on which the rails are fixed;
  tolerances of a height of the central part of the overhead line above the ground surface on which the overhead line is fixed;
  tolerances of a height of a roof of the rail vehicle, on which the current collector is disposed, above the rail; and
  tolerances of a height of the raised current collector above the roof of the rail vehicle,
are dimensioned such that, as the rail vehicle enters the stop, said sliding strips of the raised current collector have a height above the rail that is at least equal to the substantially constant height of said central part of the overhead line, and at most equal to the greatest height of the raised said first end portion of said overhead line above the rail.

2. The system according to claim 1, wherein said overhead line has a second end portion, having a height above the rail that increases outward from said central part, said end portion adjoining a side of said central part that is opposite said first end portion.

3. The system according to claim 1, wherein said central part and said first end portion of said overhead line are fixed contact rails.

4. The system according to claim 1, wherein said first end portion, and a second end portion opposite said first end portion, extend substantially rectilinearly at an angle of not more than 3° in relation to said central part of said overhead line.

5. The system according to claim 4, wherein said overhead line, in a transition between said first end portion and said central part, and in a transition between said second end portion and said central part, has a curvature with a radius that is greater than 5000 mm.

6. The system according to claim 1, wherein said first end portion or a second end portion is formed as a runner.

7. The system according to claim 1, wherein said overhead line has a second end portion opposite said first end portion and a third end portion, which adjoins said first end portion and has a height above the rail that increases outward from said central part.

8. The system according to claim 1, wherein said current collector is a single-arm current collector with an arm of said current collector directly mounted, by way of a joint, on a base frame of said current collector.

9. A method of operating a rail vehicle, the method comprising the following method steps:
   providing a rail system having:
      at least one rail vehicle having a first end with a first vehicle head and a second end, opposite the first end, with a second vehicle head;
      an overhead line in a region of a stop for the rail vehicle;
      first and second current collectors having sliding strips for making contact with the overhead line, the first current collector being disposed at the first vehicle head and the second current collector being disposed at the second vehicle head;
      the overhead line having a central part with a limited, predefined length and a first end portion adjoining the central part on at least one side thereof, the central part having a substantially constant predefined height above a rail for the rail vehicle, and the first end portion having a height above the rail that increases outward from the central part;
   wherein the current collectors of the rail vehicle are raised and matched to the overhead line such that, as the rail vehicle enters the stop, sliding strips of the current collectors have a height above the rail that is at least equal to the substantially constant height of the central part of the overhead line, and at most equal to a greatest height of the raised first end portion of the overhead line above the rail; and
   wherein a length of the central part of the overhead line is greater than a spacing distance of the sliding strips of the first and second current collectors from one another;
   driving the rail vehicle, with the first and second current collectors raised, into the stop;
   establishing a galvanic contact between the first raised current collector and the first end portion of the overhead line;
   advancing the rail vehicle while maintaining the galvanic contact between the raised first current collector and the overhead line at the central part thereof;
   subsequently establishing a galvanic contact between the raised second current collector and the first end portion of the overhead line, and transferring electrical energy from the overhead line to the rail vehicle;
   advancing the rail vehicle while maintaining the galvanic contact between the raised second current collector and the central part of the overhead line;
   driving the rail vehicle, with the first current collector raised, out of the stop, and interrupting the galvanic contact between the raised first current collector and the overhead line; and
   driving the rail vehicle, with the second current collector raised, out of the stop, and interrupting the galvanic contact between the raised second current collector and the overhead line.

10. The method according to claim 9, which comprises raising the current collector to such an extent that, as the rail vehicle enters the stop, the sliding strips of the current collector have a height above the rail that is at least equal to the substantially constant height of the central part of the overhead line, and that is at most equal to the greatest height of the raised first end portion of the overhead line above the rail.

11. The method according to claim 9, which comprises, prior to establishing the galvanic contact between the first and/or second raised current collector and the overhead line, and/or prior to separating of the galvanic contact between the first and/or second raised current collector and the overhead line, converting a travel voltage, provided by an energy storage device, to at least a value of a predefined supply voltage of a contact wire of the overhead line.

* * * * *